United States Patent
Chu

(10) Patent No.: US 9,554,290 B2
(45) Date of Patent: Jan. 24, 2017

(54) WIRELESS COMMUNICATION SYSTEM AND METHOD FOR AUTOMATICALLY SWITCHING DEVICE IDENTIFICATIONS

(71) Applicant: MOXA INC., New Taipei (TW)

(72) Inventor: Chiung-Yu Chu, New Taipei (TW)

(73) Assignee: MOXA INC., New Taipei (TW)

( * ) Notice: Subject to any disclaimer, the term of this patent is extended or adjusted under 35 U.S.C. 154(b) by 260 days.

(21) Appl. No.: 14/585,163

(22) Filed: Dec. 29, 2014

(65) Prior Publication Data

US 2016/0192215 A1 Jun. 30, 2016

(51) Int. Cl.
*H04W 24/04* (2009.01)
*H04L 12/24* (2006.01)

(52) U.S. Cl.
CPC .............. *H04W 24/04* (2013.01); *H04L 41/00* (2013.01)

(58) Field of Classification Search
CPC ................................ H04L 41/00; H04W 24/04
See application file for complete search history.

(56) References Cited

U.S. PATENT DOCUMENTS

| | | | | |
|---|---|---|---|---|
| 6,108,300 A * | 8/2000 | Coile | ................. | G06F 11/2005 340/2.9 |
| 6,202,169 B1 * | 3/2001 | Razzaghe-Ashrafi | .. | G06F 11/20 714/1 |
| 6,757,242 B1 * | 6/2004 | Wang | ...................... | H04L 45/02 370/216 |
| 7,200,649 B1 * | 4/2007 | Batke | ................ | H04L 29/12264 370/252 |
| 7,948,983 B2 * | 5/2011 | Arena | ................. | H04L 61/2046 370/216 |
| 8,825,904 B2 * | 9/2014 | Leng | ................... | H04L 12/2856 709/245 |
| 2004/0215752 A1 * | 10/2004 | Satapati | ............ | H04L 29/12386 709/223 |
| 2005/0160312 A1 * | 7/2005 | Seng | ................... | G06F 11/1637 714/13 |
| 2006/0107108 A1 * | 5/2006 | Geng | ..................... | H04L 12/28 714/11 |
| 2014/0204727 A1 * | 7/2014 | Gu | ........................ | H04W 12/04 370/217 |

* cited by examiner

*Primary Examiner* — Mounir Moutaouakil
(74) *Attorney, Agent, or Firm* — Chih Feng Yeh; Huntington IP Consulting Co., Ltd.

(57) ABSTRACT

A wireless communication system and methods for automatically switching device identifications are disclosed, where the device identifications are automatically determined by a plurality of work devices connected to a cable network after a connection time, respectively, and the one among the plurality of work devices becomes a main device may transmit a survive message to the work devices becoming a backup device, and the main device is determined as failing to work normally and a new main device is automatically determined again when the backup device fails to receive the survive message transmitted by the main device or a switch notification transmitted by the main device, so that the wireless communication on a carrier may have an improved stability and the technical efficacy may be achieved that the work device may automatically and rapidly determine the main device when no main device existing in the wireless network environment.

20 Claims, 7 Drawing Sheets

WIRELESS COMMUNICATION SYSTEM AND METHOD FOR AUTOMATICALLY SWITCHING DEVICE IDENTIFICATIONS

BACKGROUND OF RELATED ART

Technical Field

A wireless communication system and method, and particularly to a mobile communication system and method where devices therein may be automatically switched Related Art Wireless network is a computer network employing one or more wireless communication. As compared to the cable network, a main difference is that nodes in the wireless network may be interconnected without using any cable.

In the case where no cable network is available for communication use, a wireless communication manner is generally used. For example, at a train station, near a cable train rail, a yacht or a cannel, a communication may be possible with a traffic carrier, like a train, a cable train or a ship. However, since the train, cable train, ship may continuously move on the course of the wireless communication. Hence, the connection between a work device on the carrier and wireless access point is unstable and possible to be interrupted by environment.

To solve the above problems, more than one work devices are disposed on the carrier. When the work device fails to connect to the wireless access point, another work device on the carrier may attempt to connect to the wireless access point, so that a redundancy may be used to maintain the wireless network to be stable. However, this process from the disconnection of the previous work station to connection of the next work device to the access point lasts several seconds, and which may not be neglected in the wireless communication use. In this case, data in a terminal device within the wireless communication environment may usually be interrupted.

In view of the above, there has long been the problem of the unstable wireless communication use. Therefore, there is quite a need to set forth an improvement means to settle down this problem.

SUMMARY

In view of the problem of the unstable wireless communication use on a mobile carrier, the present invention sets forth a wireless communication system and method for automatically switching device identifications.

According to the present invention, a wireless communication system, applied onto a work device, for automatically switching a plurality of device identifications, comprising a cable network interface, connecting to a cable network, the cable network providing a connection for at least one of one or more work devices; a wireless network interface, waiting for a connection with a wireless network; a protocol processing module, swapping for a protocol message through the cable network with each of the one or more other work devices when receiving a switch notification transmitted by one of the one or more other devices through the cable network interface or when a survive message transmitted by one of the one or more other work devices is absent from being received within a predetermined time, when the wireless network interface is successfully connected to the wireless network, respectively, for the one or more work devices, and selecting each of the one or more work devices as a main device or a backup device as a plurality of backup devices according to the connection time, the protocol message comprising a connection time of the connection of each of the one or more other work devices and the wireless network; an activity processing module, recording by the main device an IP address and a MAC address as of a source end and a destination end as an address pair within packets passing through the main device and transmitting a survive message to the one or more other work devices comprising the address pair through the cable network when the protocol processing module is selected to be the main device, and transmitting the switch notification to the one or more other work devices through the cable network; and a backup processing module, receiving the survive message transmitted by one of the other work devices through the cable network and recording the address pair, respectively, when the protocol processing module selects the backup device among the one or more other devices.

According to an aspect of the present invention, the wireless communication method, applied onto a work device, for automatically switching a plurality of device identifications, comprising steps of connecting a cable network, the cable network providing a connection for one or more other work devices; waiting for a connection with a wireless network; swapping for a protocol message through the cable network with each of the one or more work devices, respectively, the protocol message comprising a connection time of the connection between the work device or the one or more other work devices and the wireless network; selecting a main device otherwise a backup device as a plurality of backup devices among the other work devices according to the connection time between the work device or the one or more other work devices and the wireless network, respectively; when the main device is selected: recording by the main device an IP address and a MAC address as of a source end and a destination end as an address pair within packets passing through the work device and transmitting a survive message each comprising the address pair to the one or more other work devices through the cable network, respectively; and transmitting a switch notification to the one or more other work devices through the cable network, respectively, when the main device is unable to connect to the wireless network; when the backup device is selected: receiving the survive message transmitted by one of the one or more other work devices and recording the address pair within the packets; and swapping again for the protocol message by the one or more other work devices, and selecting again the new main device or the backup device according to the connection time between the work device or the one or more other work devices and the wireless network, when receiving the switch notification transmitted by one of the one or more other devices or the survive message is absent from being received within a predetermined time.

According to another aspect of the present invention, the wireless communication method for automatically switching a plurality of device identifications, comprising steps of connecting a plurality of work devices through a cable network, respectively; connecting each of the plurality of work devices through a wireless network, respectively; swapping for a protocol message through the cable network by each of the plurality of work devices, respectively, the protocol message comprising a connection time associated with each of the work devices; selecting a main device otherwise a backup device according to the connection time of each of the plurality of work devices among the plurality of work devices, respectively, wherein only one of the plurality of work devices becomes the main device and the other work devices as a plurality of backup device; and recording by the main device an IP address and a MAC address as of a source end and a destination end as an address pair within packets passing through the main device and transmitting a survive message to the plurality of backup devices each comprising the address pair through the cable network, respectively; receiving the survive message transmitted by the main device by each of the plurality of backup devices and recording the address pair of the plurality of backup devices, respectively; and transmitting a switch notification to each of the plurality of backup devices through the cable network by the main device, respectively, when the main device is unable to connect to the wireless network; and swapping again for the protocol message by each of plurality of backup devices, and selecting one of the plurality of backup devices as a new main device according to the connection time of each of the plurality of work devices, when each of the plurality of backup devices receives the switch notification transmitted by the main device or the survive message is absent from being received by each of the backup devices within a predetermined time, respectively.

The system and methods of the present invention have the difference as compared to the prior art that the device identifications are automatically determined by the plurality of work devices connected to the same cable network after the connection time and the one among the plurality of work devices becomes the main device may transmit the survive message to the work devices becoming the backup device, and the main device is determined as failing to work normally and a new main device is automatically determined again when the backup device fails to receive the survive message transmitted by the main device or a switch notification transmitted by the main device, so that the problem encountered in the prior art may be solved and the technical efficacy may be achieved that the work device may automatically and rapidly determine the main device when no main device existing in the wireless network environment.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

The present invention may enable a plurality of work devices connected with a cable network to automatically determine a main device and a plurality of backup devices after being connected to a wireless network, so that terminal devices connected to the same cable network may use the wireless network through the main device. Concurrently, when the main device may not provide the terminal devices to use the wireless network, the backup device may automatically determine a new main device in very soon to enable the terminal devices capable of using the wireless network.

Figure 1A:
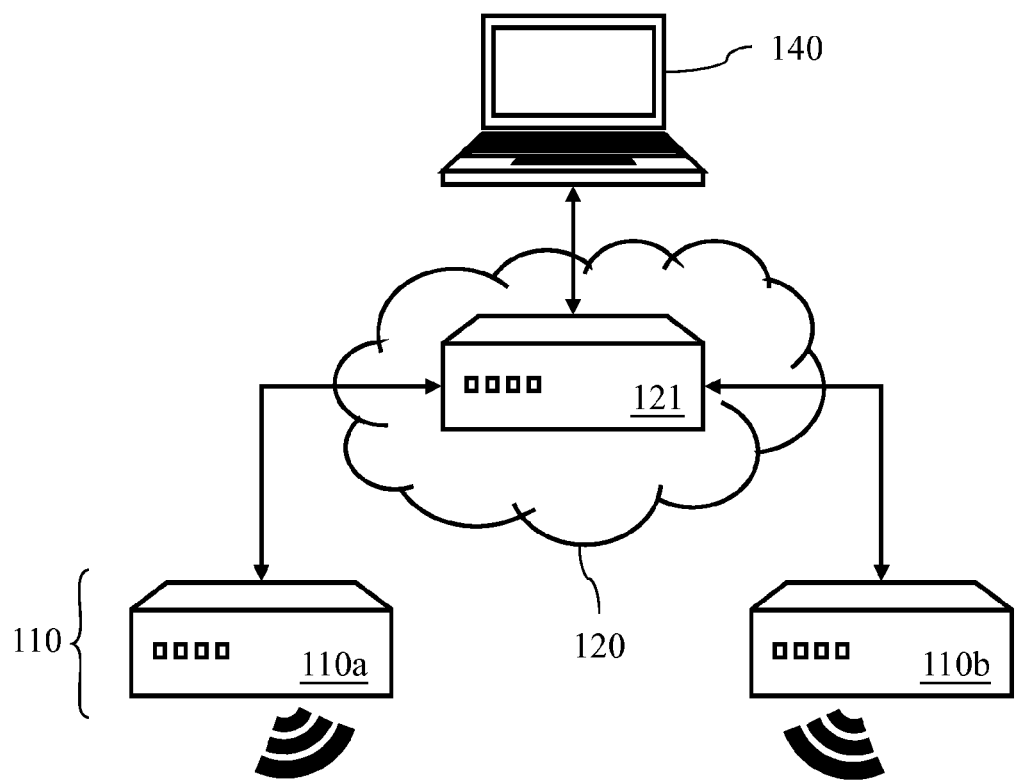
FIG. 1A is a network architecture diagram of a wireless communication system for automatically switching device identifications according to the present invention.
Figure 1A:
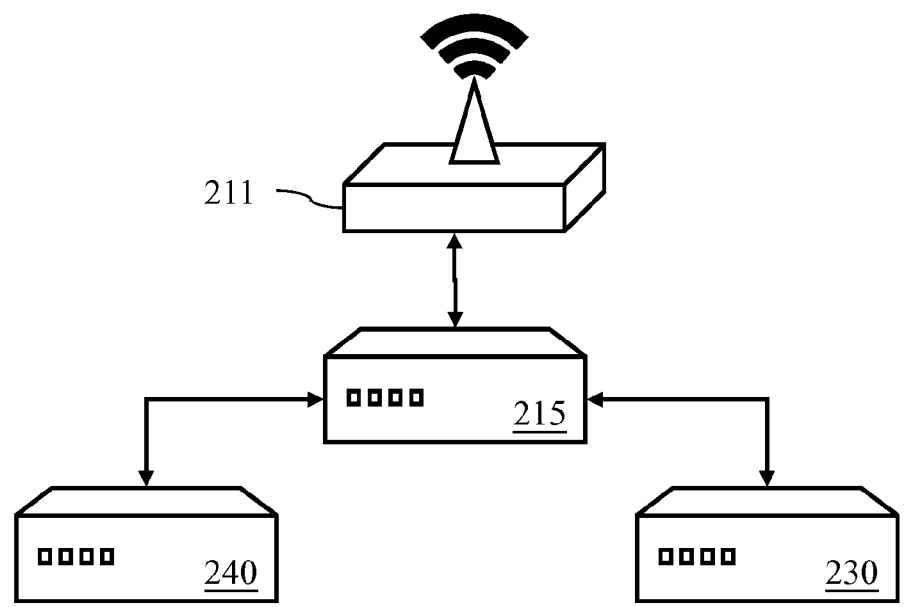

In the following, FIG. 1A is first illustrated for a description of a network environment on which the wireless communication for automatically switching device identifications of the present invention. FIG. 1A is a network architecture diagram of a wireless communication system for automatically switching device identifications according to the present invention. As shown, the network environment of the present invention comprises a plurality of work devices 110 (presented on the figure with two work devices 110, 11b, but which is merely an example but not a limitation), a transmitting device 121, a terminal device 140, a wireless access (AP) point 211, a transmitting device 215, a central control server 230, and a wireless access controller 240.

Figure 1B:
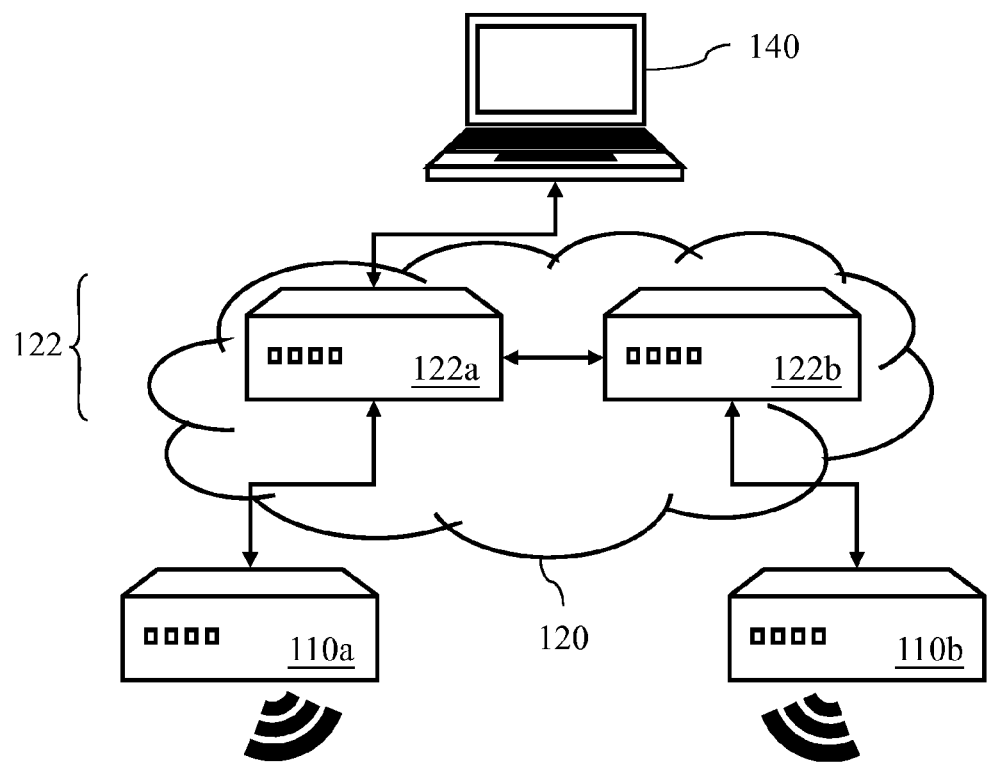
FIG. 1B is another network architecture diagram of the wireless communication system for automatically switching device identifications according to the present invention.
Figure 1B:
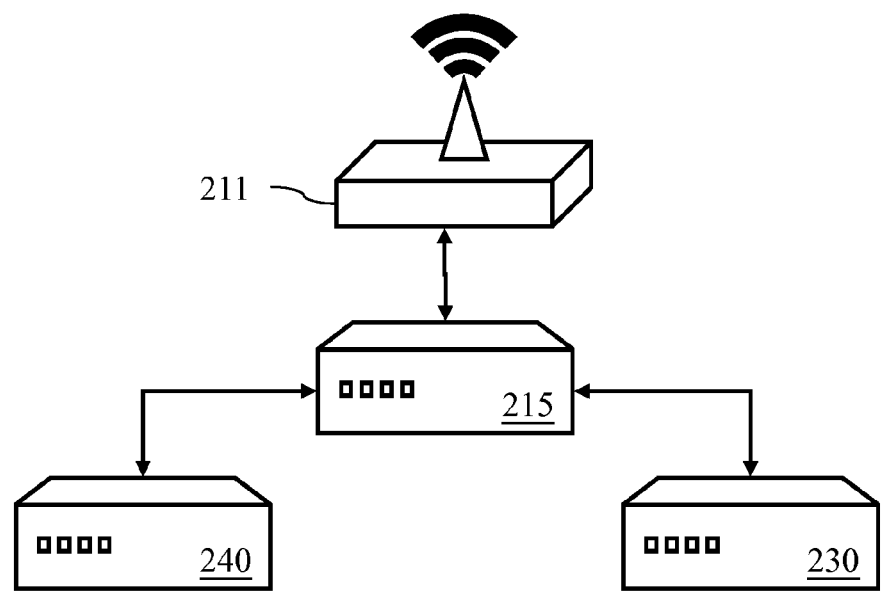

In addition, the network environment may also be provided as what FIG. 1B illustrates. FIG. 1B is another network architecture diagram of the wireless communication system for automatically switching device identifications according to the present invention. As shown, the network environment of the present invention comprises a plurality of work devices 110, a plurality of transmitting devices (presented on the figure with two work devices 122a, 122b, but which is merely an example but not a limitation), a terminal device 140, wireless access point (AP) 211, a transmitting device 215, a central control server 230, and a wireless access controller 240. It is to be noted that the transmitting devices 121, 122a, 122b, 215 are each a device capable of receiving and transmitting broadcast packets, such as a switch or a hub, which are merely examples without limiting the present invention.

The work devices 110a and the work device 110b may be connected to the transmitting device 121 or the transmitting device 122a, 122b, and automatically selected as a main device or a backup device after connecting to the wireless access point 211, i.e. establishing a communication channel. In this manner, the terminal device 140 may become the work devices 110a or work device 110b, the wireless access point 211 and the transmitting device 215 of the main device and thus be capable of communication with some other network devices (not shown in the figure). In some embodiment, the wireless access point 211 and the transmitting device 215 may be combined as a transmitting device capable of concurrently providing a wireless connection and a cable connection.

Assume the main device is the work device 110a, the backup device is the work device 110b now. When the work device 110a of the main device fails to provide a service for wireless communication of the terminal device 140, for example, the work device 110a fails to connect to the wireless access point 211 or the transmitting device 121 or the transmitting device 122a, the work device 110b becoming the backup device will become a new main device. In this manner, the terminal device 140 may still maintain it communication with the central control server 230, the wireless access controller 240 and/or other network devices (now shown in the figure).

Figure 2:
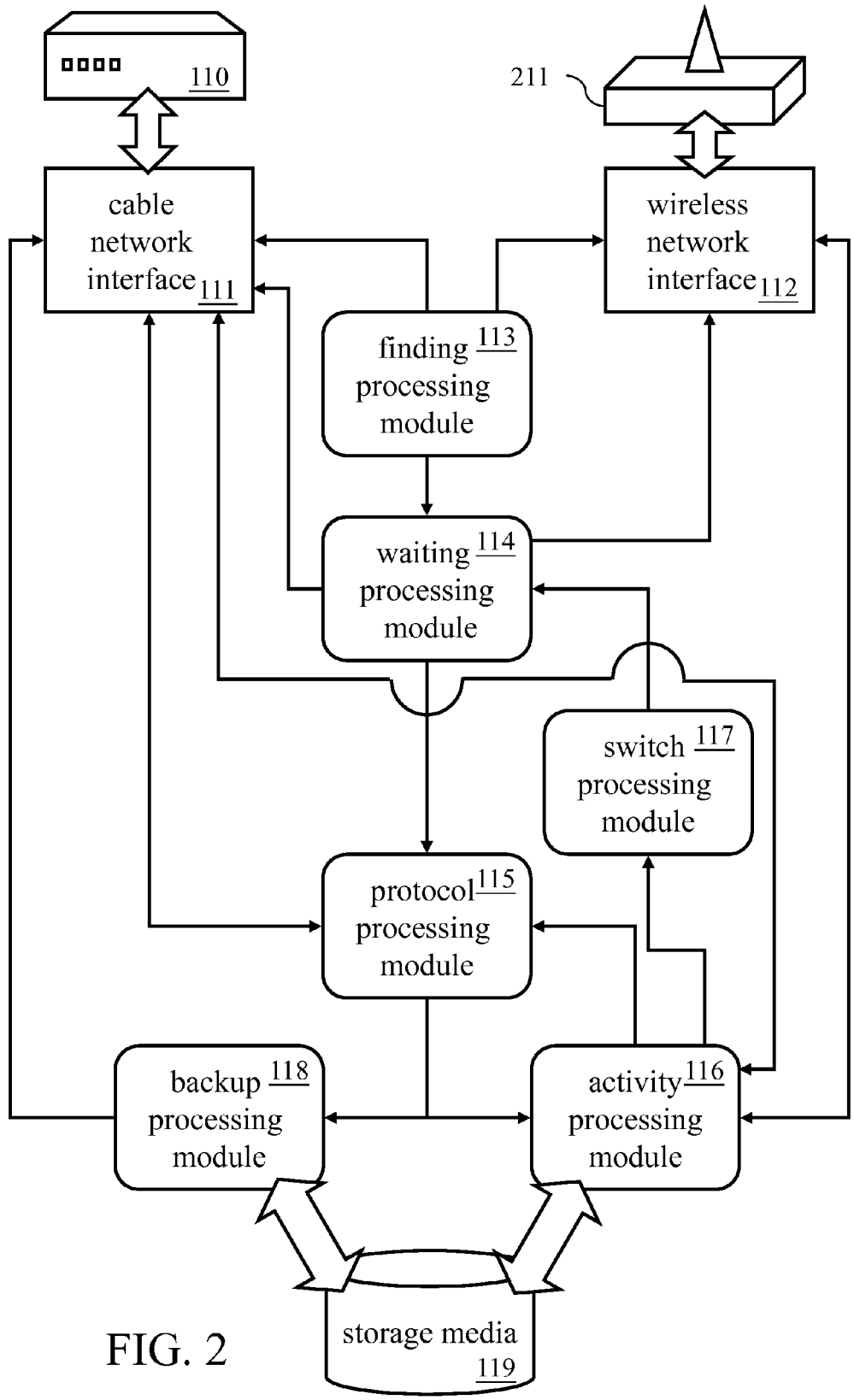
FIG. 2 is a system architecture diagram of the wireless communication system for automatically switching device identifications according to the present invention.

Thereafter, FIG. 2 is illustrated to describe how an associated wireless communication system operates. FIG. 2 is a system architecture diagram of the wireless communication system for automatically switching device identifications according to the present invention. As shown, the work device 110 of the present invention comprises a cable network interface 111, a wireless network interface 112, a waiting processing module 114, a protocol processing module 115, an activity processing module 116, a switch processing module 117, and an additionally selective finding processing module 113.

The cable network interface 111 is used for a connection to the cable network 120. Generally, after the work device is connected with a network cable, the cable network interface 111 may directly or indirectly get connected to the transmitting devices 121 or 122a or 122b within the cable network 120 through the network cable connected to the work device 110. The cable network 120 connected to the cable network interface 111 may provide a connection service for one or more work devices through the respective transmitting devices contained.

The wireless network interface 112 is connected to the wireless network. Generally, the wireless network interface 112 may continuously detect the as-existed wireless networks and attempt to establish a wireless transmission channel with the wireless access points within the wireless network having been detected, so that a connection to the wireless network is possible by means of the successfully established wireless transmission channel.

The finding processing module 113 may block the cable network. For example, it may drops packets coming from the cable network 120, but may allow broad packets and multicast packets coming from the cable network 120. Generally, the finding processing module 113 may possibly operate for only a predetermined time period. When the finding processing module 113 determines the operation time as meeting up with the predetermined time period, the finding processing module 113 may end up this operation.

The finding processing module 113 may generate a finding message, which may comprise a temporal data. Generally, the temporal data is data seldom repeated. In some embodiment, the temporal data contained in the finding message is generated according to a media access control (MAC) address of the work device 110 by the finding processing module 113, such as a checksum of the MAC.

The finding processing module 113 may swap for the finding message with other work devices connected to the cable network 120. In some embodiment, the finding processing module 113 may continuously broadcast the generated finding message, e.g. the finding message is broadcast every 10 milliseconds. At the same time, the finding processing module 113 may also receive the finding message broadcast by other work devices.

The finding processing module 113 may also determine a virtual group identification data according to the temporal data contained within the finding message received and the generated finding message itself In some embodiments, the finding processing module 113 may compare the temporal data contained within each of the finding messages and select the maximum or minimum temporal data from the finding messages as the virtual group identification data. However, the determination manner regarding the virtual group identification data may be those other than that cited above.

The waiting processing module 114 may wait for a connection between the wireless network interface 112 and the wireless network when the work device 110 stays outside a connection with the wireless network, and may also wait for a connection between the cable network interface 111 and the cable network 120 when the work device 110 fails to get connected with the cable network, e.g. the network cable is pulled off or peels off from the work device 110, or the transmitting device connected with the network cable has a failure.

The waiting processing module 114 may allow all the packets may permit all the packets coming from the cable network 120 and a connection between the wireless network interface 112 and the wireless network. Further, when the wireless network interface 112 successfully connects to the wireless network, the waiting processing module 114 records a time associated with the connection between the wireless network interface 112 and the wireless network. In this invention, the time for the connection between the wireless network interface 112 of the work device 110 and the wireless network is termed as "connection time".

The protocol processing module 115 generates a protocol message. Generally, the protocol message generated by the protocol processing module 115 contains the connection time of the successful connection between the wireless network interface 112 and the wireless network, but which is merely an example of the present invention without limiting the present invention.

The protocol module 115 transmits the generated protocol message to one or more of the other work devices through the cable network interface 111 and receive the protocol message transmitted by the other work devices, respectively, so that it may swap for the protocol message with the other work devices.

Generally, the protocol message may be transmitted on broadcast packets, group broadcast packets, management packets, or unicast packets, but which are merely examples without limiting the present invention. In some embodiments, the protocol processing module 115 may continuously transmit the protocol message to the other work device once for e.g. every 10 milliseconds (merely an example without limiting the present invention), and continuously receive the protocol message transmitted by the other work devices concurrently.

In addition, the protocol processing module 115 also swap for the protocol message with one or more of the work devices through the cable network interface 111 when it receives a switch notification transmitted by the other work devices through the cable network interface 111, respectively, or receives no any survive message transmitted by the other work devices within a predetermined time period, such as 100 milliseconds, but which is merely an example without limiting the present invention. The switch notification message and the survive message will be described later.

The protocol processing module 115 also selects the work device 110 to be the main device or the backup device according to the connection time contained within the protocol message received. In some embodiments, the protocol processing module 115 may possibly end up its operation after the work device 110 is selected as the main device or the backup device, but which is merely an example without limiting the present invention.

If the connection time associated with the successful connection between wireless network interface 112 successfully connects to wireless network and the connection time contained within the protocol message received are identical, the protocol processing module 115 may further select the work device 110 to be the main device or the backup device according to the MAC address of the work device 110 and the other work device transmitting the protocol message containing the identical connection time, respectively. For example, the protocol processing module 115 may select the work device 110 to be the main device when the former MAC address is larger than the latter MAC address, otherwise the backup device, but which is merely an example without limiting the present invention.

It is to be particularly noted that only one of the work devices 110 may become the main device among the work devices jointly connected to the cable network 120, while the others the backup devices.

In addition, the protocol processing module 115 also selects the work device 110 to be the backup device when it receives a response message transmitted by the other work devices through the cable network interface 111, after it transmits the protocol message.

The protocol processing module 115 may swap for the protocol message with the other work devices through the cable network interface 111 again upon receiving the survive message transmitted by the other work devices through the cable network interface 111, respectively, upon receiving the survive message transmitted by the other and select the work device 110 to be the main device or the backup device according to the connection time contained within the respective protocol messages.

The protocol processing module 115 may also swap for the protocol message with the other work devices through the cable network interface 111 again, respectively, after the connection between the wireless network interface 112 and the wireless network stops and then restores. The protocol processing module 115 selects the work device 110 to be the main device or the backup device according to the connection time contained within the protocol message for each of the work devices 110, respectively, or the backup device according to the received response message.

The protocol processing module 115 may also swap for the protocol message again with one or more of the work devices when the cable network interface 111 connects to the cable network 120 again after the cable network interface 111 fails to connect to the cable network, respectively, and select the work device 110 to be the main device or the backup device according to the connection time contained within the swapped protocol message, respectively.

The activity processing module 116 operates after the protocol processing module 115 selects the work device 110 to be the main device. In the course of the operation of the activity processing module 116, the respective connections between the cable network interface 111 and the cable network 120 and between the wireless network interface 112 and the wireless network have to be maintained concurrently.

The activity processing module 116 records an address pair for an IP address and a media access control (MAC) address of a source end and a destination end contained in a packet passing through the work device 110. Generally, the activity processing module 116 may record the address pair a storage media 119 embedded in the work device 110, in which the storage media 119 may be a random access memory (RAM), a flash memory, a hard disk (HDD), or the like, which are merely examples without limiting the present invention. Any storage components capable of data storage arranged in the work device 110 may be taken as the storage media 119.

In the course of the activity processing module 116, if the cable network interface 111 disconnects from the cable network 120, or the wireless network interface 112 gets disconnected from the wireless network, the activity processing module 116 may end up its operation and the work device 110 may lose its main device's identification concurrently. In real implementation, the packets passing through the work device 110 may possibly be very many, but the activity processing module 116 may only record for once for the one having the same address pair. For example, when the wireless access controller 240 transmits two packets to the terminal device 140, the two packets may pass through the work device 110 as long as the work device 110 is then the main device, no matter they are transmitted concurrently or separately by the wireless access controller 240. When the activity processing module 116 receives the packets transmitted to the terminal device 140 by the wireless access controller 240, it may extract the IP address and the MAC address of the wireless access controller 240 contained within the packet as an address pair, and compare the extracted address pair and the stored address pair. If the work device 110 receives the first time the packet transmitted by the wireless access controller to the terminal device 140, then the stored address pair may not be the same as that extracted by the activity processing module 116. Therefore, the activity processing module 116 may record the extracted address pair. If the work device 110 receives the packet transmitted by the wireless access controller 240 to the terminal device 140 for the second time, the extracted address pair by the activity processing module 116 will be identical to that as stored. Therefore, the activity processing module 116 will not record the extracted address pair again.

The activity processing module 116 transmits the survive message to the other work devices through the cable network interface 111 and the cable network 120, i.e. to the backup devices. In some embodiments, the survive message transmitted by the activity processing module 116 may contain the address pair recorded by itself, but which is merely an example without limiting the present invention. The activity processing module 116 may also separately transmit the survive message and the recorded address pair.

The activity processing module 116 may also transmit the response message to the other work device issuing out the protocol message upon receiving the protocol message transmitted by the other work devices. The activity processing module 116 may also end up its operation upon receiving the survive message transmitted by the other work device. At this time, the work device 110 does not act as the main device until the protocol processing module 115 selects the work device 110 to be the main device again.

When the work device 110 switches itself from the backup device to the main device, the activity processing module 116 may transmit ARP request to each of the terminal device 140 having its IP address contained within the address pair recorded by the work device 110 when acting as the backup device through the cable network interface 111, so as to ascertain if the terminal device exists, i.e. ascertain if the terminal device 140 still connect to the work device 110 through the cable network 120. When the activity processing module 116 receives the ARP message transmitted back from the terminal device 140 through the cable network interface 111, when the activity processing module 116 may ascertain the terminal device 140 still maintain its connection with the cable network 120.

The activity processing module 116 may also transmit an GARP request to each of target devices having its IP address contained within the address pair recorded by the work device 110 when acting as the backup device, when the work device 110 switches itself from the backup device to the main device, in which the target device may be such as the terminal device 140 and the central control server 230. As such, one or more transmitting devices 121, 122 between the target device and the work device 110 may update its data flow direction. For example, when the work device 110b replaces the work device 110b to become the main device from its original backup device's role, the activity processing module 116 may simulate the central control server 230 to transmit the GARP request to the terminal device 140. When the GARP request passes through the transmitting device 121 or the transmitting device 122a, the transmitting device 121 or 122a may modify a connection port transmitting the packets issued from the terminal device 140 according to the GARP request, so that the packets issued by the terminal device 140 is transmitted to the work device 110b but not continuously to the work device 110a. Similarly, the activity processing module 116 may simulate the terminal device 140 to transmit the GARP request to the central control server 230. When the GARP request passes through the wireless access point 211, the wireless access point 211 may transmit the packets to the terminal device 140 by using a wireless transmission channel established with respect to the work device 110b according the GARP request, so that the packets transmitted to the terminal device 140 are directed to the work device 110b but not through the wireless transmission channel established with respect to the work device 110b.

The switch processing module 117 operates when the protocol processing module 115 selects the work device 110 to be the main device and the wireless network interface 112 fails to connect to the wireless network. Generally, the switch processing module 117 may possibly operate for only a predetermined time period, such as 50 milliseconds, but which is merely an example without limiting the present invention. When the switch processing module 117 determines the operation time meeting up with the predetermined time, it may possibly stop it operation.

The switch processing module 117 continuously transmit a switch notification to the other work devices, i.e. the backup device, through the cable network interface 111, so that the work device becoming the backup device may reselect to switch to be the main device or maintained as the backup device. For example, the switch processing module 117 may transmit a switch notification for every 10 milliseconds, but which is merely an example without limiting the present invention. The switch processing module 117 may transmit the switch notification in the manner of broadcast, group broadcast, and unicast, but which are merely examples without limiting the present invention.

The backup processing module 118 operates when the protocol processing module 115 selects the work device 110 to be the backup device. In the course of operation of the backup processing module 118, the connection between the cable network interface 111 and the cable network 120 and the connection between the wireless network interface 111 and the wireless network have to be maintained concurrently. At the same time, the backup processing module 118 may block the packets passing through the cable network 120 except for the broadcast packets and the multicast packets. In the course of operation f the backup processing module 118, if the cable network interface 111 and the cable network 120 get disconnected to each other or the wireless network interface 112 an the wireless network get disconnected to each other, the backup processing module 118 will stop its operation.

The backup processing module 118 receive the survive message transmitted by the other work device, i.e. the main device through the cable network interface 111, so as to determine if the main device works normally. When the backup processing module 118 receives the survive message transmitted by the main device within a predetermined time, such as 100 milliseconds, but which is merely an example without limiting the present invention. At the same time, the time is re-counted, by which the main device is determined if it has transmitted the survive message within a predetermined time. If the backup processing module 118 does not receive the survive message transmitted by the main device within the predetermined time, the backup processing module 118 may determine the main device as failing to work normally, and may possibly stop its operation at the same time.

The backup processing module 118 also records the address pair transmitted by the main device. Generally, the backup processing module 118 reads out the address pair from the survive message transmitted by the main device and records the as-read address pair into the storage media 119, so that the address pair may be used when the work device 110 switches from the backup device into the main device. However, the address pair is not limited as only being contained within the survive message.

Figure 3A:
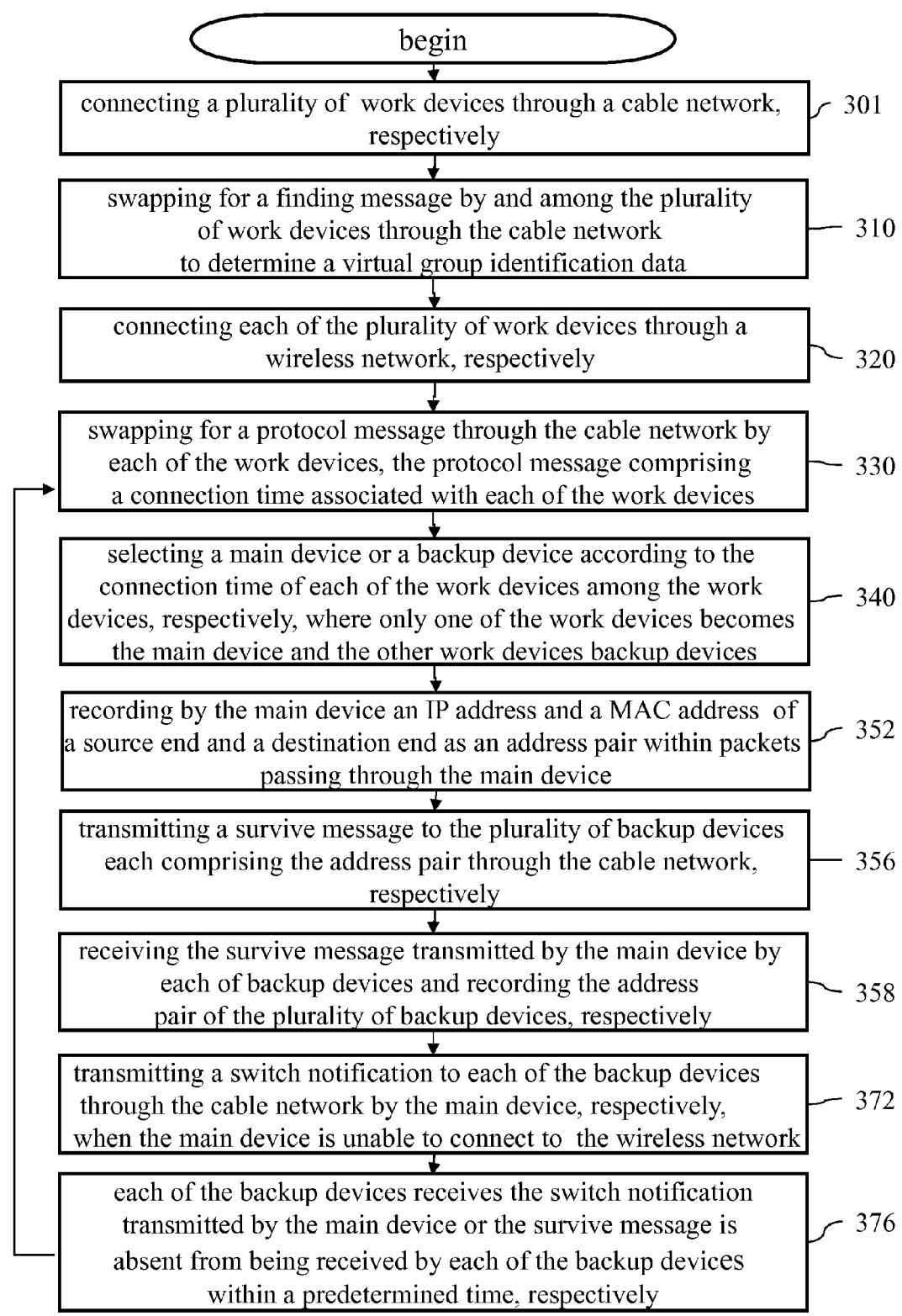
FIG. 3A is a flowchart of a wireless communication method for automatically switching device identifications according to the present invention.

Thereafter, an embodiment is set forth to explain how the system and method of the present invention operate, with reference to FIG. 3A simultaneously. FIG. 3A is a flowchart of a wireless communication method for automatically switching device identifications according to the present invention. In this embodiment, assume the work devices 110a, 110b, the transmitting device 121 are all disposed on a loose pulley, and the terminal device 140 may connect to the transmitting device 121 through the cable network 120, in which the work device 110a is disposed at a ship front portion while the work device 110b the ship tail portion, and the wireless access point 211 and the transmitting device 215 may be disposed at two sides of the wharf or a canal where the loose pulley are around. After the work device 110 is booted, the work device 110 may enter an initial state. At this time, the work device 110 still has not got connected to the cable network 120 and the wireless network interface 112 may first stop attempt its connection with the wireless network, so that the connection time associated with the connection between wireless network interface 112 may be avoided from being earlier than the connection time associated with the connection between the cable network interface 111 and the cable network, which causes a loop occurring or an incorrect packet transmission issues.

Thereafter, after the cable network interface 111 of the work device 110 connects to the cable network 120 (S301), if the work device 110 includes the finding processing module, then the work device 110 may enter a finding state. At this time, the finding work device 110 of the work device 110 may block all the packets passing through the cable network interface 111 except for the broadcast packets, group broadcast packets, or management packets. At the same time, the finding processing module 113 of the work device 110 may also activate a timer. When the predetermined time is reached, the finding processing module 113 may stop its operation, while the waiting processing module 114 of the work device 110 may begin its operation.

The finding processing module 113 of the work device 110 also determines a virtual group identification data through the cable network to swap for the finding message mutually (S310). In this embodiment, the finding processing module 113 of the work devices 110a, 110b may generate a temporal data according the MAC address of the work device 110a, 110b, respectively, and generate the finding message comprising the temporal data. After the finding processing module 113 of the work device 110a generates the finding messages, it may broadcast the generated finding message through the cable network 111 of the work device 110a to the cable network 120 for every 10 milliseconds, so that it may be expected that all the work devices (the work device 110b in this embodiment) connected with the cable network 120 may receive the generated finding message, respectively. Similarly, the finding processing module 113 of the work device 10 may also transmit the generated finding message to the work device 110a through the cable network 111 of the work device 110b. Thereafter, the finding processing module 113 of the work device 110a, 110b may compare the generated temporal data and the temporal data of the received finding message and select the maximum or minimum one in the temporal data to be the virtual network identification data.

If the work device 110 does not include the finding processing module 113 or the finding processing module 113 and thus ends up its operation, the work device 110 may enter the waiting state. In the waiting state, the waiting processing module 114 may allow the work device 110 all the packets passing through the cable network 120 passes through the cable network interface 111, and wait for the connection between the wireless network interface 112 of the work device 110 become valid, i.e. wait for a transmission channel established between the wireless network interface 112 and the wireless access point 211. When the loose pulley gradually approaches or sails on the canal, the work device 110 may gradually approaches the access point 211. When the work device 110 approaches the wireless access point 211 enough, the wireless network interface 112 may successfully connects to the wireless network (S320). Thereafter, the waiting processing module 114 may record the connection time associated with the connection between the wireless network interface 112 and the wireless network, so that the connection time may be provided to the protocol processing module 115 of the work device 110 to be used.

After the cable network interface 111 connects to the cable network 120 and the wireless network interface 112 connects to the wireless network, the work device 110 may enter the protocol state. At this time, the waiting processing module 114 may end up its operation. At the same time, the protocol processing module 115 of the work device 110 may set its timer and swap for protocol messages with the other work devices connected with the cable network 120 through the cable network 120 (S330). In this embodiment, the protocol processing module of the work device 110a may generate the protocol message contains the connection time associated with the successful connection between the wireless network interface 112 of the work device 110a and the wireless network, and broadcast the generated protocol message to all the other work devices, i.e. the work device 110b, connected with the cable network 120 through the cable network interface 111 of the work device 110a. Similarly, the protocol processing module 115 of the work device 110b may also transmit the protocol message containing the connection time to the work device 110a through the cable network interface 111 of the work device 110a. After the protocol processing module 115 of the work device 110 receives the protocol message transmitted by the other work devices through the cable network interface 111 of the work device 110, respectively, the protocol processing module 115 may select the work device 110 to be the main device or the backup device according to the connection time contained within the protocol message received (S340). In this embodiment, the protocol processing module 115 of the work device 110 may compared the connection time at the wireless network interface 112 of the work device 110 and the connection time contained within the protocol message received. For example, when the connection time associated with the connection between the wireless network interface 112 of the work device 110a and the wireless network is earlier than the connection time associated with the connection between the wireless network interface 112 of the work device 110b and the wireless network, the protocol processing module 115 of the work device 110b may compare and then determine this condition, and thus select the work device 110b to be the backup device and does not select the work device 110a to be the backup device. The protocol processing module 115 continues to wait for receiving the protocol message transmitted by the other work devices until the set time in the timer reaches its timeout. If when the timer is time out and the work device 110a still has not be selected to be the backup device, the protocol processing module 115 of the work device 110a may select the work device 110a to be the main device.

If the protocol processing module 115 of the work device 110 selects the work device 110 to be the main device, the work device 110 may enter an activity state, so as to provide the terminal device 140 to communicate with the central control server 230, the wireless access controller 240, or the other network devices. At this time, the protocol processing module 115 of the work device 110 may stop its operation, and the activity processing module 116 of the work device 110 may record the address pair for the IP address and the MAC address of the source end and the destination end within the packets passing through the main device (S352). In this embodiment, assume the work device 110a becomes the main device, the packets passing through the work device 110a may possibly be the ones transmitted to the central control server 230 or the wireless access controller 240 by the terminal device 140, or the ones transmitted to the terminal device 140 by the central control server 230 or the wireless access controller 240. Therefore, the address pair recorded by the activity processing module 116 of the work device 110a may possibly contain the IP and MAC addresses of the source end, the terminal device 140, the IP and MAC addresses of the destination end, the central control server 230, the IP and MAC addresses of the source end, the terminal device 140, the IP and MAC addresses of the destination end, the wireless access controller 240, the IP and MAC addresses of the source end, the central control sever 230, the IP and MAC addresses of the destination end, the terminal device 140, the IP and MAC addresses of the source end, the wireless access controller 240, the IP and MAC addresses of the destination end, the terminal device 140, and the like.

At the same time, the activity processing module 116 of the work device 110 may also continuously transmit the survive message of the address pair recorded to the other work devices connected with the cable network 120 through the cable network 120 (S356), so that the other work devices receiving the survive message may ascertain the work device 110a becoming the main device work normally, and record the address pair in the survive message. In this embodiment, the activity processing module 116 of the work device 110a becoming the main device may broadcast the survive message to the cable network 120 through the cable network interface 111 of the work device 110a for every 50 milliseconds. As such, the other work devices connected with the cable network 120 becoming the backup device may all receive the survive message.

If the protocol processing module 115 of the work device 110 selects the work device 110 to be the backup device, the work device 110 may enter a backup state. At this time, the protocol processing module 115 of the work device 110 may also stop it operation and the backup processing module 118 of the work device 110 may block all the packets passing through the cable network 120, but permit the broadcast packets, group broadcast packets, or the management packets to pass through the cable network 120.

When the backup processing module 118 of the work device 110 receives the survive message transmitted by the other work devices connected with the cable network 120, i.e. the main device, through the cable network interface 111 of the work device 110, it may record the address pair within the survive message received (S358). In this embodiment, the work device 110*b* may record the address pair to the storage device 110 of the work device 110*b*. Afterwards, assume the wireless network interface 112 of the work device 110*a* becoming the main device fails to connect to the wireless network. For example, when the work device 110*a* is blocked by the ship body from the wireless access point 211 or the work device 110*a* is too far away from the wireless access point 211 and thus the signal strength is too weak for the wireless access point to enable the work device 110*a* to establish a transmission channel, the work device 110*a* will enter a switch mode. In the switch mode, the switch processing module 117 of the work device 110*a* may set the timer, and continuously transmit the switch notification to all the work devices connected with the cable network 120 through the cable network 120 (S372), so that all the other work devices acting as the backup device connected with the cable network 120 (S376). In this embodiment, the switch processing module 117 of the work device 110*a* may broadcast the switch notification to the cable network 120 through the cable network interface 111 of the work device 110*a*. As such, the backup processing module 118 of the work device 118 becoming the backup device may receive the switch notification transmitted by the work device 110*a* to the cable network 120 through the cable network interface 111. At the same time, when the timer set by the switch processing module 117 of the work device 110*a* reaches its timeout, the work device 110*a* may enter the waiting state again. At this time, the waiting processing module 114 may wait for the wireless network interface 112 connecting to the wireless network again.

Figure 3B:
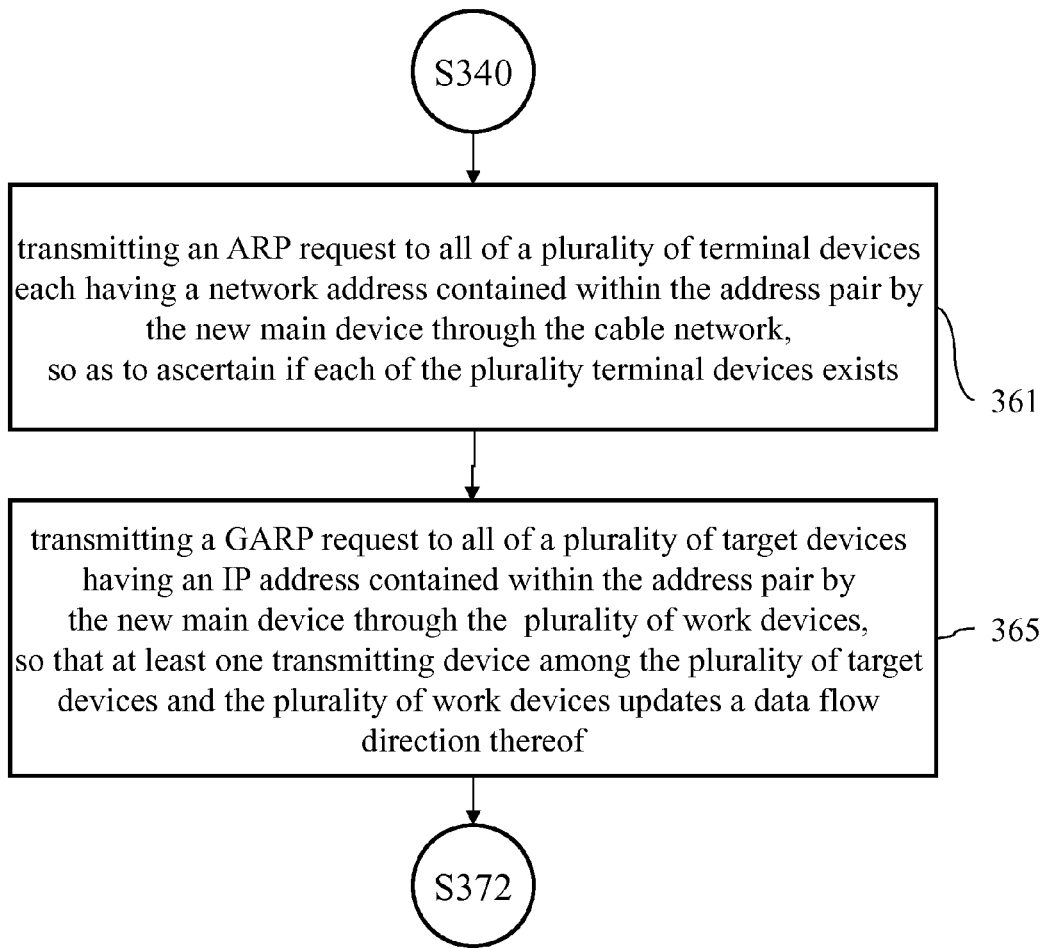
FIG. 3B through FIG. 3D are a flowchart of an additional portion of the wireless communication method for automatically switching device identifications according to the present invention, respectively.
Figure 3C:
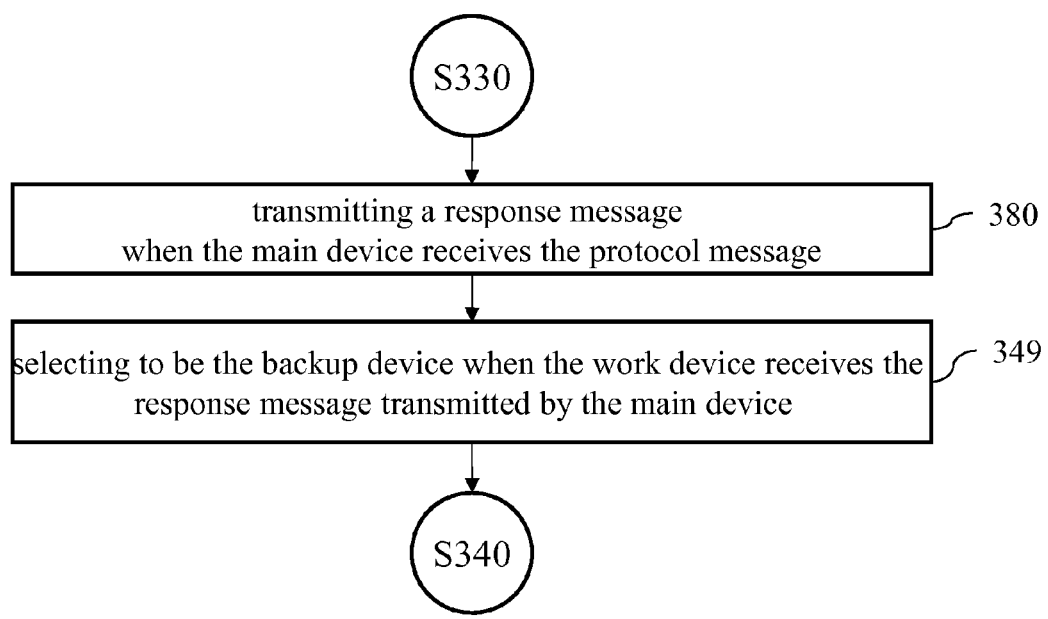

After the backup processing module 118 of the work device 110*b* receives the switch notification transmitted by the work device 110 through the cable network 120 (S376), the work device 110 *b* may enter a protocol state again. At this time, the backup processing module 118 of the work device 110*b* may end up its operation, and the protocol processing module 115 of the work device 110*b* may swap for the protocol message with the other work devices acting as the backup devices through the cable network 120 (S330), and select the work device 110*b* to be the main device or the backup device again according to the connection contained within the protocol message (S340). In this embodiment, if only the work device 110*a* and the work device 110*b* are connected to the cable network 120, the protocol processing module 115 of the work device 110*b* may possibly not receive the protocol message transmitted by the other work devices when the timer reaches its timeout. Therefore, when the protocol processing module 115 of the work device 110*b* has its timer reaching its timeout, the protocol processing module 115 of the work device 110*b* may select the work device 110*b* to be the main device. And, if there is still any of the work devices connecting with the cable network 120, the protocol processing module 115 of the work device 110*b* may also receive the protocol message transmitted by the other work devices 110*b* through the cable network interface 111, and select the work device 110*b* to be a new main device to maintain as the backup device. Assume the protocol processing module 115 of the work device 110*b* selects the work device 110*b* to be the new main device, the work device 110*b* may enter the activity state. At this time, the activity processing module 116 of the work device 110*b* may not only record the address pair formed by the IP address and MAC address of the source end and the target end within the packets passing through the work device 110 becoming the main device (S352), and continuously transmit the survive message containing the recorded address pair to the other work devices 110 connected with the cable network 120 through the cable network 120 (S356), it may also transmit an address resolving request all the terminal devices each having its IP address contained within the address pair through the cable network interface 111 of the work device 110*b*, as is shown as the process flow in FIG. 3B, so as to ascertain if the terminal device 140 exists (S361), and/or transmit the GARP request to each of the target devices each having an IP address contained within the address pair through the cable network, so that the transmitting device between the target devices and the work device may update it data flow direction (S365). In this embodiment, it corresponds that the packets transmitted by the terminal device 140 to the central control server 230, the wireless access controller 240, or the other network devices are enabled to reach the work device 110*b*, and the packets transmitted to the terminal device 140 by the central control server 230, the wireless access controller 240, and the like may be directed to the work device 110*b* by the wireless access point 211. Thereafter, if the wireless network interface 112 of the work device 110*a* connects again to the wireless network (S320), the work device 110*a* may enter the protocol state again. The protocol processing module 115 of the work device 110*a* may swap for the protocol message with the other work devices connected with the cable network 120 through the cable network interface 111 of the work device 110*a* (S330). Since the work device 110*b* has become the main device, when the activity processing module 116 of the work device 110*b* receive the protocol message transmitted by the work device 110*a* through the cable network interface 111*a* of the work device 110*b*, the work device 110*b* may transmit a corresponding response message to the work device 110*a*, as is shown in FIG. 3C.

When the cable network interface 111 of the work device 1100*b* receives the protocol message transmitted by the work device 110*a*, the corresponded response signal may be transmitted back to the work device 110*a* (S380). The protocol processing module 115 of the work device 110*a* may select the work device 110*a* to be the main device after receiving the response signal through the cable network interface 111 of the work device 110*a* (S349).

It may be known from this embodiment, it may be finished within only 200 to 250 micro-seconds from a disconnection state between the original main device, i.e. the work device 110*a*, and the wireless access point 211 to becoming the new main device and a connection state of the work device 110*b* with respect to the wireless access point 211 in this invention, which is apparently shorter than the required time several seconds for the prior art and the time 200 to 250 micro-seconds is an acceptable delay for the wireless network.

Figure 3D:
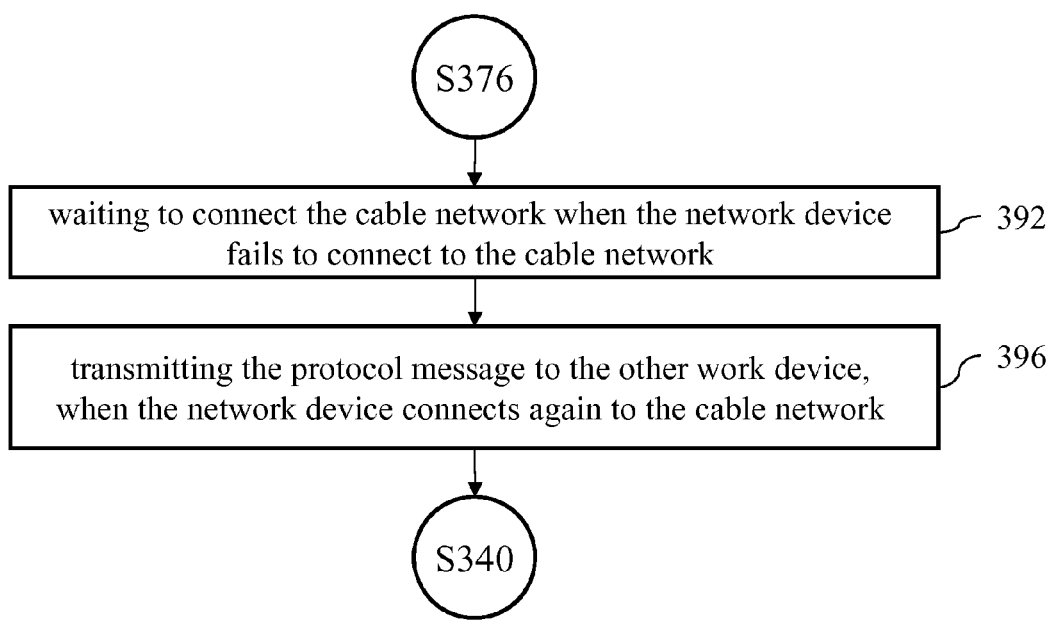

In addition, when the cable network interface 111 of the work device 110 fails to connected to the cable network 120, as shown in FIG. 3D, the work device 110 may enter the waiting state. At this time, the waiting processing module 114 of the work device 110 may wait for the cable network interface 111 to connect to the cable network 120 again (S392). At the same time, if the work device 110 is selected to be the main device, the other work devices becoming the backup devices may fail to receive the survive message transmitted by the work device 110 (S376). Therefore, the other work devices becoming the backup devices may enter the protocol state, and the protocol processing module 115 may swap for the protocol message through the cable network interface 111 (S330) and select the new main device again according to the connection time contained within the protocol message (S340). When the cable network interface 111 of the work device 110 connects to the cable network 120 again, the work device 110 may also enter the protocol state, and the protocol processing module 115 of the work device 110 may swap for protocol message with the other work devices through the cable network interface 111 of the work device 110, respectively (S396). At this time, since the new main device has existed, the protocol processing module 115 of the work device 110 may receive the response signal transmitted back by the new main device through the cable network interface 111 of the work device 110 and select the work device 110 to be the backup device (S349).

In addition, in the above embodiment, if the work device 110a and the work device 110b, shown in FIG. 1B, connect to the transmitting device 122a and the transmitting device 122b within the cable network 120, respectively, once the transmitting device 122a and the transmitting device 122b get disconnected, with the assumption that the current main device is the work device 110b, the work device 110a becoming the backup device may also fail to receive the survive message transmitted by the work device 110b even the work device 110b transmits out the survive message as normal (S376). Therefore, after the backup processing module 118 of the work device 110a has its timer reaching its timeout, the work device 110a may enter the protocol state. At this time, the protocol processing module 115 of the work device 110a may swap for the protocol messages with the other work devices capable of connecting the transmitting device 122a (S330), so as to select the new main device or the backup device as maintained (S340). In this manner, the terminal device 140 connected with transmitting device 122a still may communicate with the central control server 230, the wireless access controller 240, or other devices through the transmitting device 122a, the new main device, such as the work device 110a, the wireless access point 211, and the transmitting device 215. Similarly, if there is any of the terminal devices connects to the transmitting device 122b, the other terminal devices connected with the transmitting device 112b may also communicate with the central control server 230, the wireless access controller 240, or the other devices through the transmitting device 122b, the work device 110b, the wireless access point 211, and the transmitting device 215.

In this manner, it may be achieved by means of the present invention that after the plurality of work devices 110 connected with the cable network 120 are connected to the wireless network, they may be determined as becoming the main device or the backup device, so that the terminal device 140 connected to the cable network 120 may communicate with the central control server 2301 the wireless access controller 240, or other devices through the main device. At the same time, when the main device fails to continue to provide the terminal to use the wireless network for the communication use, the backup device may also automatically and rapidly determine the new main device again so that the terminal device may use the wireless network again.

In view of the above, the present invention has the difference as compared to the prior art that the device identifications are automatically determined by the plurality of work devices connected to the same cable network after the connection time and the one among the plurality of work devices becomes the main device may transmit the survive message to the work devices becoming the backup device, and the main device is determined as failing to work normally and a new main device is automatically determined again when the backup device fails to receive the survive message transmitted by the main device or a switch notification transmitted by the main device, so that the problem encountered in the prior art where the wireless communication using a single work device on a mobile carrier is not stable enough may be solved and the technical efficacy may be achieved that the work device may automatically and rapidly determine the main device when no main device existing in the wireless network environment.

Furthermore, the wireless communication method for automatically switching device identifications may be implemented within a hardware, a software or a combination thereof, and within a computer system in an integrated manner or computer system interconnected to each other in a discrete manner.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless communication method for automatically switching a plurality of device identifications, comprising steps of:
   connecting a plurality of work devices through a cable network, respectively;
   connecting each of the plurality of work devices through a wireless network, respectively;
   swapping for a protocol message through the cable network by each of the plurality of work devices, respectively, the protocol message comprising a connection time associated with each of the work devices;
   selecting a main device otherwise a backup device according to the connection time of each of the plurality of work devices among the plurality of work devices, respectively, wherein only one of the plurality of work devices becomes the main device and the other work devices as a plurality of backup device; and
   recording by the main device an IP address and a MAC address as of a source end and a destination end as an address pair within packets passing through the main device and transmitting a survive message to the plurality of backup devices each comprising the address pair through the cable network, respectively;
   receiving the survive message transmitted by the main device by each of the plurality of backup devices and recording the address pair of the plurality of backup devices, respectively; and
   transmitting a switch notification to each of the plurality of backup devices through the cable network by the main device, respectively, when the main device is unable to connect to the wireless network; and
   swapping again for the protocol message by each of plurality of backup devices, and selecting one of the plurality of backup devices as a new main device according to the connection time of each of the plurality of work devices, when each of the plurality of backup devices receives the switch notification transmitted by the main device or the survive message is absent from being received by each of the backup devices within a predetermined time, respectively.

2. The wireless communication method as claimed in claim 1, further comprising a step of swapping a finding message by and among the plurality of work devices through the cable network to determine a virtual group identification data, prior to the step of connecting each of the plurality of work devices to the wireless network, respectively.

3. The wireless communication as claimed in claim 1, further comprising a step of selecting one of the plurality of work devices receiving a response message transmitted by the main device as one of the plurality of backup devices, post to the step of swapping for the protocol message through the cable network by and among each of the plurality of work devices, respectively.

4. The wireless communication method as claimed in claim 1, further comprising a step of swapping for the protocol message with at least one of the plurality of work devices, respectively, and selecting the main device or the backup device again according to the connection time of the plurality of work devices, respectively, when the main device receives an another survive message, post to the step of selecting the one of the plurality of work devices as the main device otherwise the backup device according to the connection time of the plurality of work devices, respectively.

5. The wireless communication method as claimed in claim 1, further comprising a step of transmitting an ARP request to all of a plurality of terminal devices each having a network address contained within the address pair by the new main device through the cable network, so as to ascertain if each of the plurality terminal devices exist, respectively, post to the step of swapping again for the protocol message by the plurality of backup devices and selecting one of the plurality of backup devices as the new main device according to the connection time of the plurality of work devices, respectively.

6. The wireless communication method as claimed in claim 1, further comprising a step of transmitting a GARP request to all of a plurality of target devices having a network address contained within the address pair by the new main device through the plurality of work devices, so that at least one transmitting device among the plurality of target devices and the plurality of work devices updates a data flow direction thereof, respectively, post to the step of swapping again for the protocol message by the plurality of backup devices and selecting one of the plurality of backup devices as the new main device according to the connection time of the plurality of work devices, respectively.

7. The wireless communication method as claimed in claim 1, further comprising a step of transmitting the protocol message through the cable network to a rest portion of the plurality of work devices after the wireless network is re-connected when the main device is absent from being the main device, post to the step of transmitting the switch notification to each of the plurality of backup device through the cable network, respectively.

8. The wireless communication method as claimed in claim 1, further comprising a step of waiting for being connected to the cable network when the main device is absent from being connected to the cable network, and transmitting the protocol message to at least one among the rest portion of the plurality of work devices through the cable network and selecting again the main device or a new backup device among the plurality of work devices according to the connection time of the plurality of work devices, when the main device connects to the cable network again post to the step of selecting the plurality of backup devices as the new main device according to the connection time of the plurality of work devices, respectively.

9. A wireless communication method, applied onto a work device, for automatically switching a plurality of device identifications, comprising steps of:
  connecting a cable network, the cable network providing a connection for one or more other work devices;
  waiting for a connection with a wireless network;
    swapping for a protocol message through the cable network with each of the one or more work devices, respectively, the protocol message comprising a connection time of the connection between the work device or the one or more other work devices and the wireless network;
    selecting a main device otherwise a backup device as a plurality of backup devices among the other work devices according to the connection time between the work device or the one or more other work devices and the wireless network, respectively;
  when the main device is selected:
    recording by the main device an IP address and a MAC address as of a source end and a destination end as an address pair within packets passing through the work device and transmitting a survive message each comprising the address pair to the one or more other work devices through the cable network, respectively; and
    transmitting a switch notification to the one or more other work devices through the cable network, respectively, when the main device is unable to connect to the wireless network;
  when the backup device is selected:
    receiving the survive message transmitted by one of the one or more other work devices and recording the address pair within the packets; and
    swapping again for the protocol message by the one or more other work devices, and selecting again the new main device or the backup device according to the connection time between the work device or the one or more other work devices and the wireless network, when receiving the switch notification transmitted by one of the one or more other devices or the survive message is absent from being received within a predetermined time.

10. The wireless communication method as claimed in claim 9, further comprising a step of swapping for the protocol message with the one or more other work devices and selecting again the main device or the one or more work devices, when receiving a survive message transmitted by the one or more work devices.

11. The wireless communication method as claimed in claim 9, further comprising a step of waiting for a renewed connection to the wireless network and thereafter transmitting the protocol message to the one or more other work devices through the cable network, post the step of transmitting the switch notification to the one or more other work devices through the cable network, respectively.

12. The wireless communication method as claimed in claim 9, further comprising a step of when the main device is selected, determining the main device as failing to connect to the cable network, waiting for the connection with the cable network, and when the cable network is connected, transmitting the protocol message to the one or more other work devices through the cable network, and selecting again the main device or a new backup device according to the connection time between the work device or the one or more other work devices and the wireless network, respectively.

13. A wireless communication system, applied onto a work device, for automatically switching a plurality of device identifications, comprising:
   a cable network interface, connecting to a cable network, the cable network providing a connection for at least one of one or more work devices;
   a wireless network interface, waiting for a connection with a wireless network;
   a protocol processing module, swapping for a protocol message through the cable network with each of the one or more other work devices when receiving a switch notification transmitted by one of the one or more other devices through the cable network interface or when a survive message transmitted by one of the one or more other work devices is absent from being received within a predetermined time, when the wireless network interface is successfully connected to the wireless network, respectively, for the one or more work devices, and selecting each of the one or more work devices as a main device or a backup device as a plurality of backup devices according to the connection time, the protocol message comprising a connection time of the connection of each of the one or more other work devices and the wireless network;
   an activity processing module, recording by the main device an IP address and a MAC address as of a source end and a destination end as an address pair within packets passing through the main device and transmitting a survive message to the one or more other work devices comprising the address pair through the cable network when the protocol processing module is selected to be the main device, and transmitting the switch notification to the one or more other work devices through the cable network; and
   a backup processing module, receiving the survive message transmitted by one of the other work devices through the cable network and recording the address pair, respectively, when the protocol processing module selects the backup device among the one or more other devices.

14. The wireless communication system as claimed in claim 13, further comprising a finding processing module for determining a virtual group identification data by swapping a finding message with the one or more other work devices through the cable network interface.

15. The wireless communication system as claimed in claim 13, the protocol processing module further swapping for the protocol message with the one or more other work devices through the cable network interface and selecting the one or more other work devices as the main device or the plurality of backup devices according to the connection time.

16. The wireless communication system as claimed in claim 13, wherein the protocol processing module further swapping for the protocol message with the one or more other work devices through the cable network and selecting again the one or more other devices to be the main device or the backup device as the plurality of backup devices, respectively, when the activity processing module receives an another survive message transmitted by one of the one or more other work devices through cable network interface.

17. The wireless communication system as claimed in claim 13, wherein the activity processing module further transmitting an address analysis request to all the plurality of terminal devices each having the network address contained within the address pair for the one or more work devices to ascertain if each of the plurality of terminal devices exists.

18. The wireless communication system as claimed in claim 13, wherein the activity processing module further transmits a GARP request to each of the plurality of target devices each having the network address contained within the address pair for the one or more other work devices so that at least one transmitting device between each of the plurality of target devices and the work device updates a data flow direction.

19. The wireless communication system as claimed in claim 13, wherein the protocol processing module further swapping for the protocol message with the one or more other work devices through the cable network interface after the wireless network interface and the wireless network disconnect and then connect again to each other.

20. The wireless communication system as claimed in claim 13, wherein the protocol processing module further waits for the connection of the cable network interface to the cable network interface again and after the connection of the cable network interface to the cable network interface again swaps for the protocol message with at least one of the one or more other work devices, and selecting one of the one or more other work devices to be the main device or the backup device as the plurality of backup devices according to the connection time, respectively.

* * * * *